United States Patent [19]

Niklewski

[11] Patent Number: 5,372,230

[45] Date of Patent: Dec. 13, 1994

[54] BELT CONVEYOR ROLLER

[75] Inventor: Andrzej Niklewski, Sao Paulo, Brazil

[73] Assignee: Fabrica de Aco Paulista Ltda., Sorocaba, Brazil

[21] Appl. No.: 35,474

[22] Filed: Mar. 23, 1993

Related U.S. Application Data

[63] Continuation of Ser. No. 951,564, Sep. 25, 1992, abandoned.

[30] Foreign Application Priority Data

Sep. 25, 1991 [BR] Brazil .................. PI 9104213

[51] Int. Cl.[5] .......................................... B65G 13/00
[52] U.S. Cl. .................................................. 193/37
[58] Field of Search ...................... 193/37; 198/780

[56] References Cited

U.S. PATENT DOCUMENTS

| 1,580,367 | 4/1926 | Beulke | 193/37 |
| 1,742,453 | 1/1930 | Van Derhoef | 193/37 |
| 3,669,243 | 6/1972 | Fischbacher | 198/780 |
| 4,272,135 | 6/1981 | Hamblin et al. | 193/37 X |

FOREIGN PATENT DOCUMENTS

| 1046220 | 12/1953 | France | 193/37 |
| 1199720 | 12/1959 | France | 193/37 |
| 1123110 | 8/1968 | United Kingdom | 193/37 |

Primary Examiner—James R. Bidwell
Attorney, Agent, or Firm—Darby & Darby

[57] ABSTRACT

A belt conveyor roller includes a main shaft (2a); a pair of rolling bearings (3) mounted next to the ends of the main shaft (2a); a cylindrical tubular body (4), surrounding the main shaft (2a) and incorporating, inside each opposite end, a cylindrical tubular sleeve (5), having a smaller diameter and being seated on the external path of the respective rolling bearing (3); and a sealing element (50) concentrically disposed in relation to the main shaft (2a), at each end of the latter that is external to a respective rolling bearing (3), wherein an external edge (51a) is attached to the cylindrical sleeve (5), and wherein an internal free edge (52b) is in permanent contact with the surface of a shaft end portion with reduced diameter.

17 Claims, 2 Drawing Sheets

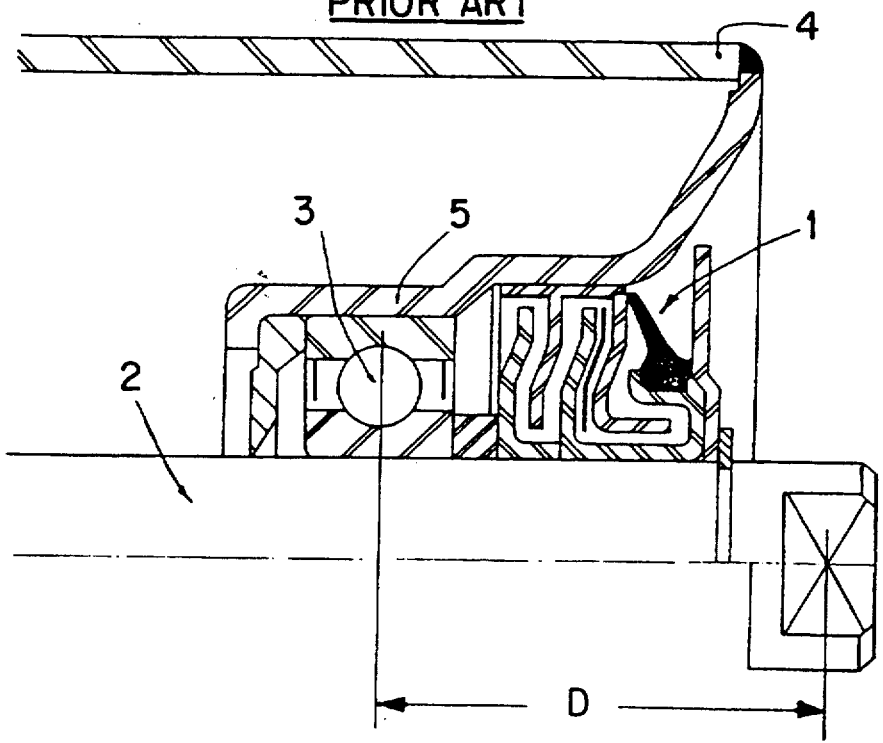
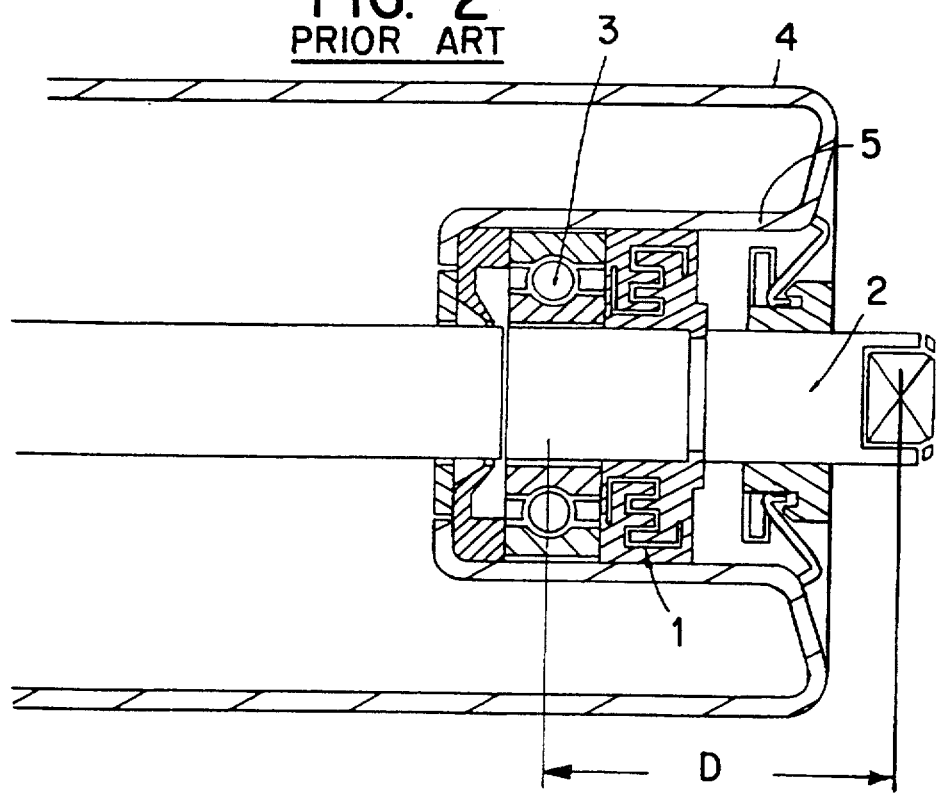

BELT CONVEYOR ROLLER

This is a continuation of application Ser. No. 7/951,564 filed Sep. 25, 1992, now abandoned.

BACKGROUND OF THE INVENTION

The present invention refers to an arrangement for sealing the end rolling bearings of a support roller in belt conveyors.

As it is known in the art, the life of the rolling bearings of a belt conveyor roller, even if said rolling bearings are correctly dimensioned to the load conditions to which they will be submitted, can be seriously affected by contamination, if the seal does not give an adequate protection against the entrance of dust and humidity. With the aim of increasing to a maximum degree the useful life of such rolling bearings, many complex sealing systems have been developed. In a general way, it can be said that the improvements which were introduced in the known seals resulted in a physical increase of the seal itself.

As illustrated in FIGS. 1 and 2, in the prior art sealing systems, the seal is disposed around the roller shaft, between an end of the latter and the adjacent rolling bearing. In these known conventional solutions, the physical increase of the seal results from its constructive sophistication, although minimizing the contamination of the rolling bearing by the undesirable entrance of dust and humidity, it increases the distance "D" between the rolling bearing and the respective end of the roller shaft. Thus, the rolling bearing is further spaced away from the shaft support point in the conveyor support, increasing the bending moment which is transmitted to the shaft and causing angular deflections in the latter, all of which are detrimental to the useful life of the rolling bearing.

Therefore, in the prior art constructions, the sophisticated and bulky seals need large and stiff shafts for the roller, thereby further requiring rolling bearings which are overdimensioned in relation to the load applied thereon. The use of thinner shafts dimensioned according to the rolling bearings which are chosen based on the load applied thereon, leads to substantial deflections at the end portions of the shaft, causing a significant decrease in the useful life of the rolling bearings.

Another inconvenience of said constructions which impairs the seal effectiveness with time, is the annular positioning of the elastomeric sealant. Due to the large distance which separates the sealant from the roller shaft and from its fastening point to the sealing system up to its free end, the sealant is constantly submitted to high tangential speeds at the contact region that causes friction with the relatively movable portion of the roller shaft. At the proximities of the sealant free end, such tangential speed causes friction wear which corrodes the edge of the elastomeric sealant free end, due to the presence of impurities on both contacting surfaces.

Moreover, the more the sealing system is spaced away from the roller shaft, the greater is the probability of sealing failures occurring, as the annular surface covering area to be protected increases.

OBJECT OF THE INVENTION

Thus, it is an object of the present invention to provide a seal for belt conveyor rollers, which allows to obtain, simultaneously, a high degree of sealing for the rollers, and a minimum distance between said rollers and the support ends of the roller shaft, eliminating the problem of shaft deflection. even when using rolling bearings which are correctly dimensioned according to the load applied thereon. Another object of the present invention is to provide a seal for belt conveyor rollers which presents a minimum tangential speed at its free portion, which is relatively movable to and causes friction with one of the parts of the assembly to be sealed, as well as a minimum annular superficial covering area.

BRIEF DESCRIPTION OF THE INVENTION

These objects are achieved through the provision of a roller of the type comprising: a main shaft; a pair of rolling bearings which are mounted next to the main shaft ends; a cylindrical tubular body which is disposed around said main shaft and which incorporates, inside each opposite end, a cylindrical tubular sleeve which has a smaller diameter and which seats on the external path of the respective rolling bearing; and a sealing element, which is disposed concentrically to the main shaft, at each end of the latter that is external to a respective rolling bearing, and presents an external edge which is fastened to the cylindrical sleeve and an internal free edge which is in permanent contact with the cylindrical surface of an end shaft portion having a reduced diameter.

BRIEF DESCRIPTION OF THE DRAWINGS

The invention will be described now, with reference to the attached drawings, in which:

FIGS. 1 and 2 illustrate two constructive arrangements of the prior art, in which the seals are mounted directly around the main shaft, between the end of the latter and the respective rolling bearing.

DETAILED DESCRIPTION OF THE INVENTION

Figure 3:
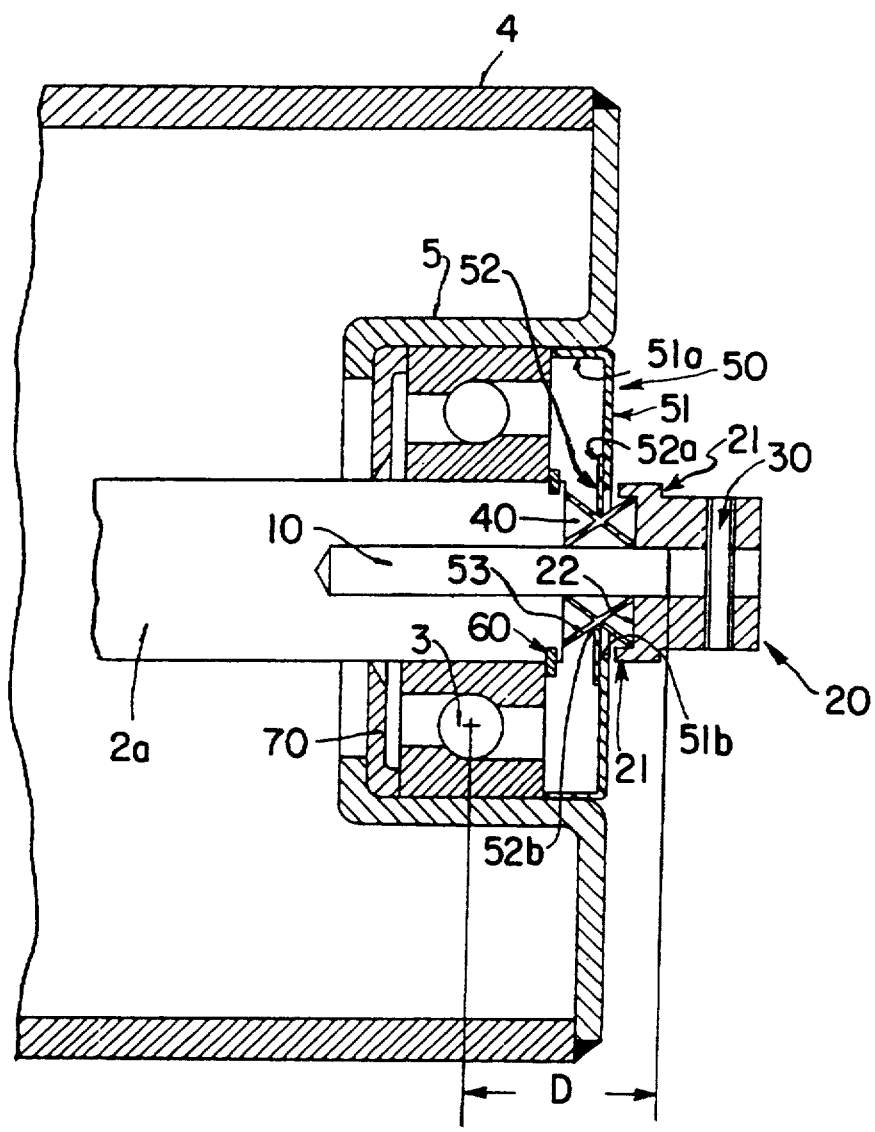
FIG. 3 is a partial diametral section view showing one of the ends of a roller, with the seal being built according to the invention.

In the prior art embodiments which are illustrated in FIGS. 1 and 2, each seal 1 (of adequate construction) is mounted directly around the main shaft 2, between the end thereof and the respective rolling bearing 3, whereupon lies the cylindrical tubular body 4 of the roller, through an internal cylindrical tubular sleeve 5, which has a smaller diameter and which is seated on the external path of the respective rolling bearing.

With this constructive arrangement, the more sophisticated and larger the construction of the seal 1, the longer will be the distance D between the end of the main shaft 2 (seating point on the conveyor support) and the respective rolling bearing 3 (point where the load of the conveyor is applied onto the shaft). This construction requires a larger dimensioning for the main shaft 2, in order to avoid undesirable bendings at the end portions of the main shaft.

According to the embodiment of the invention illustrated in FIG. 3, the main shaft 2a carries, internally at each end portion, a supporting shaft 10, having a diameter which is substantially smaller than that of said main shaft 2a and which is axially and coaxially projected of outwards the respective end of the main shaft 2a. Although having reduced dimensions, said supporting shaft 10 is made of a high strength material, in order to support elevated loads and also an eventual deflection of its portion which is external to the main shaft 2a.

Said supporting shaft 10 has an end portion, which is external to the main shaft 2a and which is attachable to a cylindrical tubular shaft end 20 that is spaced away from each respective end portion of the main shaft 2a. The attachment of the supporting shaft 10 to the shaft end 20 is achieved through an elastic annular plug 30. Said shaft end 20 has its peripheral portion facing the main shaft 2a, incorporating a continuous annular flange 21 which is axially projected towards the adjacent end of the main shaft 2a, in order to form, internally and jointly with the supporting shaft 10, an annular recess 22 facing the respective end of the main shaft 2a, with which the end edge of the annular flange 21 keeps a certain predetermined spacing.

Both opposite facing end walls of the main shaft 2a and of the respective shaft end 20 define, together with the surface of the supporting shaft 10, an annular housing 40 surrounding the latter.

In another possible embodiment, the annular housing 40 is obtained by machining an extension of the main shaft 2a itself that is projected beyond the support point of the rolling bearings 3. The shaft end 20 can be defined as an integral part of the main shaft 2a, or it may incorporate part of the extension portion of said main shaft 2a.

There is provided a sealing element 50 comprising an annular support, such as a deflecting annular cover 51 which is preferably stiff, with its radially external edge 51a being tightly attached to the cylindrical tubular sleeve 5, causing the sealing system 50 to rotate around the main shaft 2a, together with the rotation of the tubular body 4 and tubular sleeve 5. The attachment of the sealing element 50 to the tubular body is made through any adequate means, such as welding or bolting. Said annular cover 51 is provided with a radially internal free edge 51b which, in the illustrated embodiment, slightly penetrates into the inside of the annular housing 40, in order to receive and retain the radially external edge 52a of an annular elastomeric seal 52.

Said annular cover 51 has a flat surface which is orthogonal in relation to the longitudinal length of the supporting shaft 10.

Other embodiments of said cover 51 are possible, such as a conical shaped cover, without changing the result which was obtained with the preferred described profile.

According to the invention, the elastomeric seal 52 is provided with a free elastomeric edge 52b, which is radially internally located and defined by a plurality of flexible fins 53, at least one of said fins being in contact with the surface of the annular housing 40 that is defined by the bottom wall of the annular recess 22, and with at least another of said flexible fins 53 being in contact with the end portion facing surface of the main shaft 2a. In the illustrated embodiment, at least one of said flexible fins 53 contacts the surface of the annular housing 40 defined by the portion of the supporting shaft 10 which is external to the main shaft 2a. In this embodiment, the continuous annular flange 21 acts as limiting means for the flexible fins 53 which maintain the contact with the environment containing impurities, so as to avoid possible movements thereof that may lead to the entrance of dust and humidity into the region where the rolling bearings 3 are located.

During the movement of the tubular body, said edges of each pair of fins 53 create a barrier against dust and humidity, of gradual filtering, preventing said impurities from reaching the rolling bearings 3. This effect is achieved, due to the plurality of edges of the elastomeric seal, and also due to the fact that said edges are actuating at a portion of the shaft provided in a different level in relation to the surface of the main shaft 2a which carries the rolling bearings 3, since said impurities, through the effects of the progressive barrier and by the action of gravity, do not reach, or do reach, but in an insignificant concentration, the edges of the flexible fins 53 which are internally located in the annular cover 51. Even if the impurities reach the inner fins 53, the level difference between the base of the annular housing 40 and the rolling bearings 3 avoids the contamination thereof.

In another possible constructive arrangement, the free edge 52b of the elastomeric sealant 52 carries an elastic filtering body, which has a profile that matches the profile of the annular housing 40, but its dimensions being slightly larger than those of said housing, in order to occupy the volume of said annular housing 40 in a compressive condition, avoiding the penetration of the impurities described above.

Still according to the embodiment illustrated in FIG. 3, each rolling bearing 3 is kept in place through a respective elastic element 60, which is located in a groove provided next to the end of each end portion of the main shaft 2a, and through a respective rolling bearing thrust ring 70, which is provided internally to the tubular body 4 opposed to said elastic element 60.

The sealing system 50 described above presents, as a consequence of its reduced perimeter, a minimum sealing area, thus allowing a higher efficiency in protecting the rolling bearings 3 against dust and humidity. The reduced size of said sealing system also allows a significant approximation of the rolling bearings 3 to the respective external supporting point (distance D), minimizing the deflection of the main shaft 2a. Furthermore, the tangential speed of the sealing element portion in contact with the supporting shaft 10 is substantially reduced in the described solution, thus increasing the useful life of said sealing system 50 and rolling bearings 3.

What is claimed is:

1. A belt conveyor roller comprising:
   a shaft having a first portion of a first diameter,
   a roller bearing mounted at an end of said shaft first portion,
   a second shaft portion of a second diameter less than the said first diameter coaxial with and extending from an end of said shaft first portion to define a seal housing area with an adjacent face of said roller bearing at said end of said shaft first portion, said shaft first and second portions being separate pieces which are attached, and
   sealing means for said roller bearing in said seal housing area.

2. A belt conveyor roller as in claim 1 wherein said shaft first portion has a said second portion at each end forming a respective said seal housing area for a respective bearing and sealing means therefore, the roller end face at each end of said shaft first portion being annular, said sealing means in each said seal housing area being in sealing contact with each shaft second portion and the respective annular end face of said shaft first portion.

3. A belt conveyor roller as in claim 1 further comprising a coaxial shaft end portion at the end of said shaft second portion remote from the end face of said shaft first portion from which said shaft second portion extends, said sealing means including a first sealing element located between said shaft end portion and said end face of said shaft first portion.

4. A belt conveyor roller as in claim 3 wherein said shaft end portion is a separate piece attached to an end of said shaft second portion.

5. A belt conveyor roller as in claim 1 wherein said shaft first and second portions are of different material.

6. A belt conveyor roller as in claim 3 wherein said shaft end portion has substantially the same diameter as said shaft first portion.

7. A belt conveyor roller as in claim 3 wherein said sealing means further comprises a tubular body coaxially mounted to said shaft first portion and having a part overlying said shaft second portion and said seal housing area.

8. A belt conveyor roller as in claim 7 wherein said tubular body has a tubular part engaging the outer surface of said roller bearing.

9. A belt conveyor roller as in claim 3 wherein said sealing means further comprises an annular cover plate surrounding said first sealing element and spaced from said shaft first portion end face.

10. A belt conveyor roller as in claim 7 wherein said sealing means further comprises an annular cover plate surrounding said first sealing element and spaced from said shaft first portion end face and said shaft end portion and engaging said overlying part of said cover.

11. A belt conveyor roller as in claim 9 wherein said sealing means further comprises a second sealing element extending from the wall of the annular cover plate surrounding its opening and said first sealing element.

12. A belt conveyor roller as in claim 3 wherein said first sealing element is annular in shape and has fins whose ends engage said shaft end portion and said shaft first portion end face.

13. A belt conveyor roller as in claim 12 wherein said sealing means further comprises an annular cover plate surrounding said first sealing element and spaced from said shaft first portion end face.

14. A belt conveyor roller as in claim 1 further comprising a sealing means at each end of said shaft first portion.

15. A belt conveyor roller as in claim 12 wherein said first sealing element is of elastomeric material.

16. A belt conveyor roller as in claim 13 wherein each of said first and second sealing elements is of elastomeric material.

17. A belt conveyor roller comprising:
a shaft having a first portion of a first diameter,
a roller bearing mounted at an end of said shaft first portion,
a second shaft portion of a second diameter less than the said first diameter coaxial with and extending from an end of said shaft first portion to define a seal housing area with an adjacent face of said roller bearing at said end of said shaft first portion, said shaft first and second portions being separate pieces which are attached,
sealing means for said roller bearing in said seal housing area,
a coaxial shaft end portion at the end of said shaft second portion remote from the end face of said shaft first portion from which said shaft second portion extends, said sealing means including a first sealing element located between said shaft end portion and said end face of said shaft first portion, and
said shaft end portion having an extending peripheral lip facing said shaft first portion end face forming a pocket and said first sealing element including an elastomeric member held between said shaft first portion end face and said pocket.

* * * * *